Feb. 2, 1960  R. A. DWYER  2,923,580
SELF-ALIGNING SPHERICAL ROD END BEARING
Filed Jan. 22, 1958
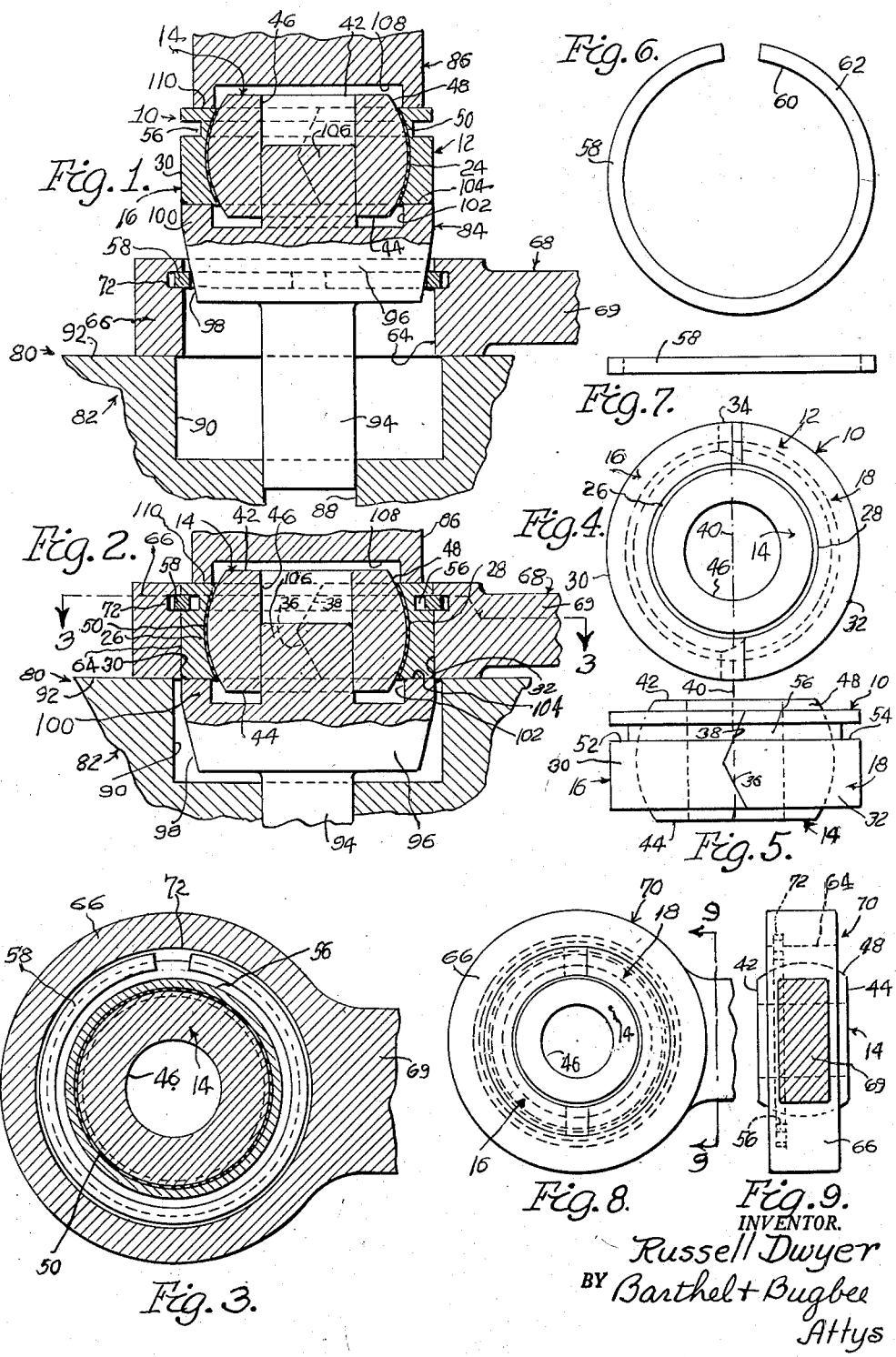
INVENTOR.
Russell Dwyer
BY Barthel + Bugbee
Attys United States Patent Office 2,923,580
Patented Feb. 2, 1960

2,923,580

SELF-ALIGNING SPHERICAL ROD END BEARING

Russell A. Dwyer, Wolverine, Mich.

Application January 22, 1958, Serial No. 710,438

3 Claims. (Cl. 308—72)

This invention relates to self-aligning bearings, such as rod end bearings or annular self-aligning bearings.

One object of this invention is to provide a self-aligning bearing which is made up of separable components which can be assembled quickly and easily and which can be made of hard materials, such as hardened steel with a coating of bearing metal between them to prevent galling.

Another object is to provide a self-aligning spherical bearing of the foregoing character which can be quickly and easily installed in a rod end or other mounting and held in position without danger of accidental dislodgment.

Another object is to provide a self-aligning spherical bearing of the foregoing character wherein the outer race or bearing unit is formed in half components which interlock with one another and are held together by the inner bearing component or bearing ball under operating conditions, but are rendered capable of separation and disassembly when the inner bearing member or ball is rotated so that its central plane is perpendicular to the central plane of the outer bearing member.

Other objects and advantages of the invention will become apparent during the course of the following description of the accompanying drawings, wherein:

Figure 1 is a central vertical section through a self-aligning spherical bearing, about to be inserted in a rod end, with the assembling mechanism in its preliminary position;

Figure 2 is a view similar to Figure 1 but with the parts assembled and with the assembling mechanism in its final position;

Figure 3 is a horizontal section taken along the line 3—3 in Figure 2;

Figure 4 is a top plan view of the self-aligning annular spherical bearing shown in Figures 1, 2 and 3, according to one form of the invention;

Figure 5 is a side elevation of the bearing shown in Figure 4;

Figure 6 is a top plan view of a snap ring used in assembling the bearing of Figures 4 and 5 in a rod end or other mounting;

Figure 7 is a side elevation of the snap ring shown in Figure 6;

Figure 8 is a top plan view of a rod end incorporating the self-aligning spherical bearing of Figures 4 and 5; and Figure 9 is a vertical section taken along the line 9—9 in Figure 8.

Referring to the drawings in detail, Figures 1 to 5 inclusive show a self-aligning spherical bearing of the present invention, generally designated 10, as consisting generally of an outer bearing unit or race 12 containing an inner bearing member or ball member 14. The outer bearing member or race 12 is made up of approximate half annular components, generally designated 16 and 18 respectively, and provided with a concave spherically-curved bearing recess 24 divided into half recesses 26 and 28 located in the half annular components 16 and 18 respectively.

The half components 16 and 18 have outer half cylindrical surfaces 30 and 32 respectively which in assembly form a full cylindrical outer surface 34. Each outer end of the half component 16 is provided with a V-shaped notch 36 into which fits a V-shaped tongue 38 on each end of the other half component 18 (Figure 5), the tongues 38 and their respective notches 36 spanning opposite sides of a diametral plane 40 (Figures 4 and 5) through the axis of the outer bearing unit 12.

The ball member or inner bearing member 14 is in the form of a sphere with flat parallel zonal opposite sides 42 and 44 with a bore 46 through the center thereof for receiving the machine element (not shown) to which the ball member 14 is connected, such as, for example, a shaft, stud or bolt. The inner bearing member or ball member 14 is also provided with an external surface 48 of spherical curvature which accurately fits the spherical internal curvature of a thin coating 50 of bearing metal, such as bronze, deposited upon the inner spherical half surfaces 26 and 28 of the outer bearing unit or race 12, with a sufficient clearance therebetween to permit suitable relative rocking movement. The coating 50 is preferably a bronze-plated coating having a thickness between 0.004 inch and 0.010 inch, the separable components of the present bearing enabling such coating to be performed after manufacture and machining has otherwise been completed. The half components 16 and 18 are also provided with approximately half annular external grooves 52 and 54 of approximately rectangular cross-section which in assembly form a complete annular groove 56 adapted to receive a snap ring 58 (Figures 6 and 7).

The snap ring 58 is of such diameter and radial thickness that it can be sprung completely into the groove 56 with its inner surface 60 near the bottom of the groove 56 and its outer surface 62 flush with the outer cylindrical surface 34, but which, when released, normally occupies a position half in and half out of the groove 38 (Figure 2).

The self-aligning bearing unit 10 is adapted to fit snugly into a cylindrical bore 64 in the head or enlarged end 66 of a rod 68 having an elongated shank 69, so as to form a unitary self-aligning bearing and rod assembly, generally designated 70. The head or end 66 has an internal annular groove 72 corresponding in cross-section to the snap ring 58 and of a depth substantially equal to the radial thickness of the snap ring 58 in order that the snap ring 58 may be expanded into the groove 72 so that its inner surface 60 is flush with the cylindrical bore 64 in the head 66 of the rod 68. In its normal relaxed condition, the snap ring 58 is of such dimensions, as shown in Figure 1, that it occupies a position approximately half in and half out of the internal groove 72 after it has been snapped into that groove.

In order to assemble and secure the self-aligning spherical bearing 10 in the rod 68, as shown in Figures 8 and 9, various means may be used, the fixture 80 shown in Figures 1 and 2 being one example. The fixture 80 consists of an anvil 82, a snap ring expander 84 and a plunger 86. The anvil 82 is provided with a bore 88 surrounded by a counterbore 90 which is slightly larger in diameter than the bore 64 in the head 66 of the rod 68, and has a flat top surface 92 upon which the head 66 is adapted to rest during the assembling operation. The expander 84 has an operating stem 94 which is slidably mounted in the bore 88 and carries on its upper end an expander head 96 having a lower tapered or conical portion 98 and an upper straight or cylindrical portion 100, the latter being of such diameter as to slide through the rod end bore 64 without excessive clearance.

The expander head 96 has an annular recess 102 on its upper end, surrounded by a flat annular surface 104 of a radial width slightly less than the radial width of one end of the outer race 12 of the self-aligning spherical bearing 10, whereas the recess 102 is of a sufficient width to accommodate the lower portion of the ball member 14 projecting axially therefrom. The expander head 96 is provided with an upstanding stem 106 which snugly but slidably fits the bore 46 in the ball member 14 and is accurately coaxial with the operating stem 94, and extends part way into the bore 46. The plunger 86 has a central circular recess 108 in its lower end, of sufficient depth to accommodate the upwardly-projecting portion of the ball member 14 and leave an annular thrust surface 110 at the periphery thereof engageable with the other end surface of the outer race 12.

To disassemble the spherical bearing 10 into its ball component 14 and two separate half components 16 and 18, let it be first assumed that the bearing 10 is in the top plan view position of Figure 4. The operator then rotates the ball member 14 a quarter revolution around a cross diameter axis lying in the plane of the paper and perpendicular to the diametral plane 40 so that the flat sides 42 and 44 move from positions parallel to the plane of the paper into positions perpendicular to the plane of the paper. In other words, the outer race 12 remains in the position shown in Figure 4 while the ball member 14 swings into the relative position shown in Figure 5 with its median or central plane vertical and perpendicular to the horizontal median plane of the outer race 12. The air gaps thus provided between the flat sides 42 and 44 of the ball member 14 and the tongues 38 and notches 36 of the outer race 12 provide clearances permitting the tongues 38 to separate from the notches 36, thereby enabling the various components 14, 16 and 18 to be disassembled. To assemble the self-aligning spherical bearing 10 from these components 14, 16 and 18, the operator reverses the above-described procedure, first placing the spherical surface 48 of the ball member 14 in one of the concave spherical surface portions 26 or 28 of one of the outer race halves 16 or 18, with its median plane disposed at right angles to the median plane of that half component 16 or 18. He then moves the other half component into mating engagement with the first-mentioned half component with the tongues 38 engaging and mating with the notches 36. He then turns the ball member 14 around a radial axis of rotation lying in its median plane from a location wherein the median planes are mutually perpendicular into a location where they are coincident, as shown in Figures 4 and 5, whereupon the spherical convex surface 48 on the ball member 14, by engaging portions of the spherical concave surfaces 26 and 28 lying in the end portions of the outer race halves 16 and 18 overlapping the central axial plane 40, serves as a key to lock the outer race halves or components 16 and 18 together.

In this respect the overlapping end portions of the bearing race halves 16 and 18 at the tongues 38 and notches 36 act like overlapping fingers engaging the circumferentially-continuous spherical peripheral surface 48 of the ball member 14 to hold the components or halves 16 and 18 together without the danger of their coming apart during operation, since each component 16 and 18 has a circumferential extent greater than a semi-circle, as clearly seen in Figure 4.

The snap ring 58 is now constricted by any suitable means, such as by tongs (not shown) and pushed into the end of the bore 64 adjacent the internal groove 72 until it comes opposite the latter and snaps halfway into it, as shown in Figure 1. The operator then places the rod 68 upon the upper surface 92 of the anvil 82 with the bore 64 coaxial with the recess 90, inserts the expander stem 94 in the bore 88 and places the self-aligning spherical bearing 10 upon the top surface 100 of the expander head 96 with the upper stem 106 entering the bore 46 of the ball member 14. He then transfers this assembly to a suitable press, such as a conventional arbor press (not shown), connects the upper plunger 86 to the plunger of the arbor press and brings the arbor press plunger downward to cause the plunger 86 to push the bearing 10 and expander 84 downward from the position of Figure 1 to that of Figure 2.

As the expander 84 moves downward, its conical surface 98 engages the inner surface 60 of the snap ring 58 and pushes it outward radially further into the internal annular groove 72 until the inner surface 60 of the snap ring 58 is substantially flush with the bore 64 in the head 66 of the rod 68, permitting the outer race 12 of the bearing 10 to slide into the bore 64 past the expanded snap ring 58, with the cylindrical outer surface 34 of the outer race 12 slidably engaging the bore 64. When the bearing 10 has so far entered the bore 12 in the rod end or head 66 that its external annular groove 50 arrives opposite the internal annular groove 72 in the head 66 (Figure 2), the snap ring 58 contracts suddenly to its relaxed condition halfway into each groove 50 and 72, locking the bearing 10 firmly and permanently in the head 66 of the rod 68. The plunger 86 is now retracted upward, permitting the unitary assembly of the rod 68 and self-aligning bearing 10 to be removed bodily from the fixture 80. The assembly 70 now has the appearance shown in Figures 8 and 9.

What I claim is:

1. A composite self-aligning bearing and mounting installation comprising a bearing mounting structure containing a bore with an annular internal groove therein, an annular outer bearing unit mounted in said bore and composed of a pair of arcuate outer bearing unit components disposed in a substantially annular path with their adjacent ends disposed in interfitting relationship with one another, said outer bearing unit having a central opening therein containing a spherically-curved internally-concave annular surface forming a ball socket, said outer bearing unit having an outer surface snugly fitting said bore of said mounting structure and having an annular external groove therein aligned with said internal groove of said mounting structure, an inner ball member seated in said socket and having a spherically-curved convex outer surface fitting the spherically-curved concave surface of said socket, and a resilient interrupted snap ring disposed in said grooves in the aligned position thereof in interlocking relationship with said mounting structure and said outer bearing unit.

2. A composite self-aligning bearing and mounting installation according to claim 1, wherein said snap ring in its relaxed condition has an external diameter smaller than the internal diameter of said mounting structure groove.

3. A composite self-aligning bearing and mounting installation according to claim 2, wherein said snap ring in its relaxed condition has an internal diameter greater than the external diameter of said outer bearing unit groove.

References Cited in the file of this patent

UNITED STATES PATENTS

| 1,356,848 | Bokelund | Oct. 26, 1920 |
| 1,474,354 | Franchi | Nov. 20, 1923 |
| 1,739,705 | Barnes et al. | Dec. 17, 1939 |
| 2,380,150 | Collito | July 10, 1945 |
| 2,541,160 | Heim | Feb. 13, 1951 |